Sept. 16, 1947.  H. J. BURNETT  2,427,588
APPARATUS FOR BURNING HOLES IN METAL
Filed Oct. 17, 1942
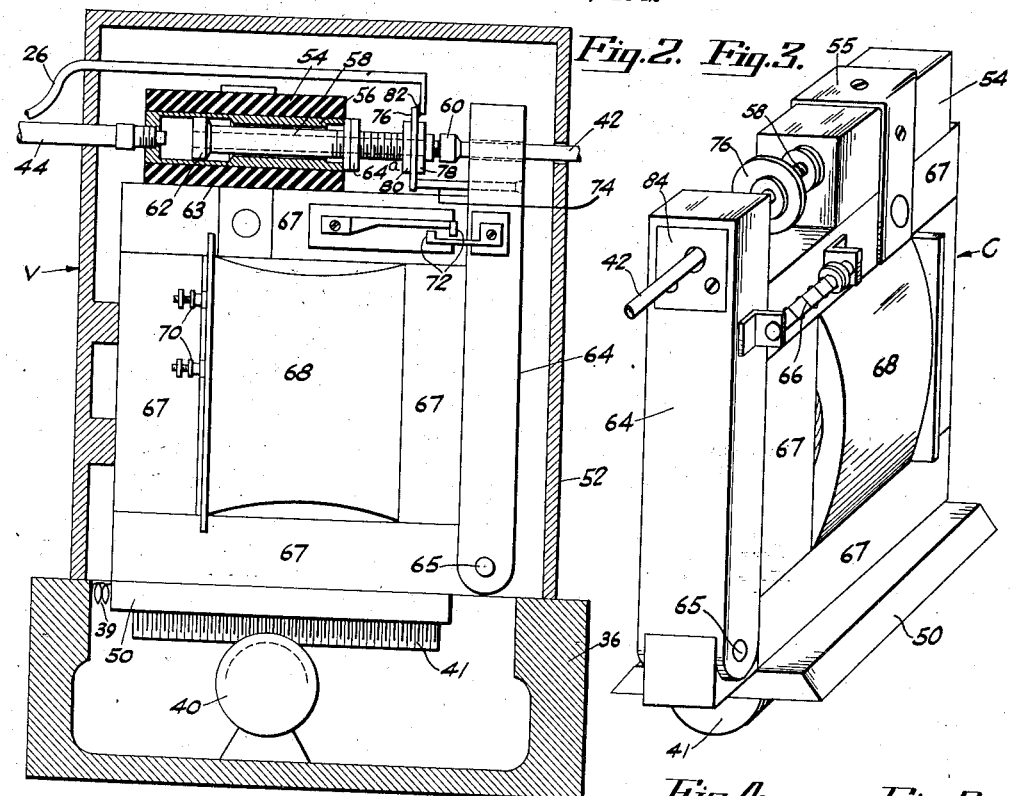
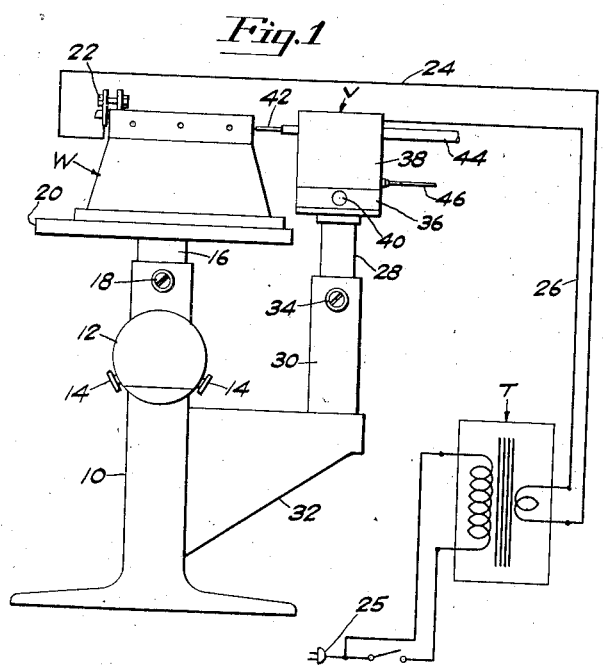
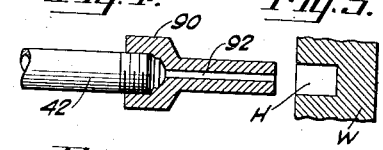
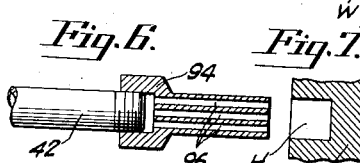
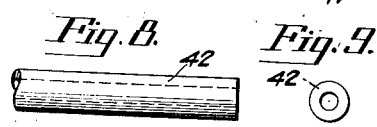
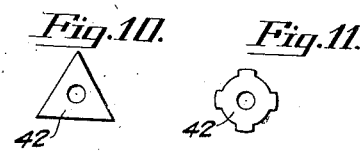
INVENTOR
Henry J. Burnett.
BY
Harris G. Lucker Patented Sept. 16, 1947

2,427,588

UNITED STATES PATENT OFFICE 2,427,588

APPARATUS FOR BURNING HOLES IN METAL

Henry J. Burnett, East Hartford, Conn., assignor to United Aircraft Corporation, East Hartford, Conn., a corporation of Delaware Application October 17, 1942, Serial No. 462,402

2 Claims. (Cl. 219—15)

This invention relates to a method and apparatus for forming holes in metal parts.

An object of this invention is to provide a method, and an apparatus, for burning precision holes in hardened metal by means of an electrical arc, without seriously affecting the physical characteristics of the hardened metal.

Other objects and advantages will be apparent from the specification and claims, and from the accompanying drawing which illustrates what is now considered to be a preferred embodiment of the invention.

In the drawings,

Fig. 1 is a diagrammatic view of a hole burning machine including a work holding fixture and an electrode vibrating mechanism.

Fig. 2 is a view partly in cross-section showing the electrode vibrating mechanism.

Fig. 3 is a perspective view of the internal structure of the mechanism of Fig. 2.

Figs. 4 to 11 are views showing modifications in electrodes.

According to my invention, a hollow electrode, which is of a size and cross-sectional shape corresponding to the size and shape of the hole to be formed, is intermittently brought into close contact with a work piece while a low voltage high amperage current (either alternating or direct) is passed through the electrode and the work. By the expressions "close contact," or "contact" used above and hereafter, I do not necessarily mean actual physical contact. As the electrode contacts the work, current starts to flow between the parts, and as the electrode is separated from the work, a burning arc is formed between the electrode and the work. This arc is extinguished by a fluid under pressure (such as an oxidizing or inert gas) which is fed through the electrode and passes out of the end thereof between the electrode tip and the work piece. As the electrode is withdrawn from the work the increasing resistance of the arc gap also tends to extinguish the arc. The pressure fluid, if of an oxidizing nature, facilitates rapid burning, aids in maintaining close arc control for precision burning, and keeps the hole clean. Also by its temperature (such as room temperature) and refrigerating effect as it expands upon issuance from the electrode, it keeps the parts sufficiently cool to prevent undue consumption of the electrode and to maintain the heat treat or physical characteristics of the work piece.

Referring to the drawings in detail, pedestal base 10 is provided with ball and socket joint 12 which may be locked in a desired angular position by set screws 14. Plunger 16 is slidably fitted in base 10 and may be locked in position by set screw 18 for the purpose of adjusting the height of work table 20. The work piece W secured to table 20 may thus be held in any desired position with respect to the electrode vibrating mechanism V. Ground clamp 22 supplies current to the work piece through lead 24 from the secondary of transformer T. Power is supplied to the primary of the transformer through connection 25. Current is fed from the other end of the transformer secondary winding by lead 26 to mechanism V and electrode 42. For feeding the electrode towards the work mechanism V includes an electrode holding carriage 38 slidably mounted on bed 36 fixed to an arm 28. To adjust the height of the electrode mechanism arm 28 is slidable in cylinder 30 fixed to base 10 by bracket 32, and is locked in adjusted position by set screw 34. While carriage 38 is automatically fed towards the work, by spring 39 (Fig. 2), a hand wheel 40 is also provided for manually sliding the carriage on bed 36.

In the electrode vibrating mechanism (Figs. 2 and 3), carriage C is slidably mounted on bed 36 by ways 50. Spring 39 between the bed and the carriage feeds the carriage and electrode toward the work. A rack 41 is affixed to the carriage and meshes with a gear attached to hand wheel 40 to manually move the carriage, for initial engagement or release of the electrode and the work piece. Carriage C may be enclosed in a casing 52.

For vibrating the electrode, and feeding pressure fluid therethrough, a cylinder casing 54 of electrical insulating material is secured to the carriage by strap 55. Cylinder 56 contains hollow piston 58 one end of which is connected at 60 to electrode 42. At its other end piston 58 is provided with enlarged head 62, and fluid under pressure entering hose 44 acts against head 62 to force piston 58 to the right, until the electrode contacts the work or head 62 abuts shoulder 63 in cylinder 56. The pressure fluid also passes through the hollow piston and into the bore of electrode 42. Current is fed to the electrode by flexible lead 26 connected at 82 to collar 76. To move or "kick" the electrode towards the left, away from the work, a laminated iron armature 64 pivots against the action of spring 66 about fulcrum 65 toward laminated iron core 67 when attracted by a magnetic field set up in said core by coil 68. Current is supplied to the coil through binding posts 70. In the circuit of coil 68 are contacts 72, which are broken by movement of the armature toward the coil as shown in Fig. 2. When the circuit is broken the magnetic field about coil 68 and iron core 67 collapses and spring 66 returns the armature to a position wherein contacts 72 are again engaged, and the cycle is repeated. The frequency of this operation may be varied by changing the force exerted by the fluid on the piston, the inertia of the moving parts, or the characteristics of coil 68, core 67, or spring 66. In practice, the vibration frequency is altered by providing an adjustment for spring 66 or a second adjustable spring (not shown) acting in conjunction with spring 66. Vibrational movements of the armature are imparted to electrode 42 by a pin 74 of dielectric material fixed to the armature and which strikes collar 76 at one end of the armature movement. Adjustment of the collar with respect to the electrode and pin is provided by nuts 78 and 80 threaded on the piston and gripping the collar therebetween. The extent of leftward movement of the piston and electrode may be varied by nut 64a threaded on piston 58 and abutting one end of cylinder 56.

If the electrode passes through the armature, as shown in Figs. 2 and 3, an insulating plate 84 may be provided to prevent electrical contact between the two parts. A similar plate (not shown) may be provided where the electrode passes through casing 52.

The operation of my apparatus is as follows: the ball joint 14 and extension arms 16 and 28 are adjusted to bring electrode 42 into proper position with respect to the work piece. Hand wheel 40 is moved to engage the electrode with the work, and an electrical potential is applied across the electrode and the work.

As the hole is burned spring 39 feeds the electrode into the hole. The electrode is vibrated by the mechanism described above, to form an intermittent arc which melts and oxidizes the metal of the work piece to form a hole corresponding in size and shape to the size and shape of the electrode tip. Pressure fluid, such as air, issuing from the end of the electrode aids in maintaining a close arc, blows out the molten and oxidized metal from the hole, and prevents injurious overheating of the parts. It may also provide either an oxidizing or inert atmosphere around the arc, depending on the particular gas used. Where alternating current is used the frequency of vibration of the electrode may be adjusted, as by varying the characteristics of spring 66, in definite relationship to the voltage and amperage waves of the current passing through the arc. It has been found that an electrode vibration frequency between 400–500 vibrations per minute with voltage values of about 5 volts and current values between 50–400 amperes, at 60 cycles, is satisfactory. The breaking of contact between the electrode and the work may be synchronized with the voltage and current waves in any desired phase relation thereto.

Because the temperature of the parts immediately adjacent the arc is high, I may use an electrode material that is either resistant to high temperatures, will dissipate without alloying with the metal of the work piece at such temperatures, or which will form an alloy of desirable physical characteristics with the metal of the work piece immediately adjacent the hole. Of course, the electrode may also be of a material having a high electrical conductivity, such as Elkonite, a copper base alloy.

In Figs. 4–11, I show several modifications in electrodes adapted for use in my invention. In Fig. 4 an adapter tip 90 is attached to electrode 42. Pressure fluid is passed to the arc through a bore 92 in the tip. In Fig. 5 the work is represented at W and the hole burned by the electrode tip at H.

Figs. 6 and 7 show a similar arrangement, but having a plurality of holes 96 in a tip 94, for providing a large area of contact between the end of the electrode and the bottom of the hole H in work piece W.

Figs. 8, 9, 10 and 11 show modifications in the cross-sectional shape of the electrode, for producing correspondingly shaped holes.

It is to be understood that the invention is not limited to the specific embodiment herein illustrated and described, but may be used in other ways without departure from its spirit as defined by the following claims.

I claim:

1. In apparatus for forming precision holes in hardened metal, an elongated electrode, means for applying an electric potential across said electrode and the metal for establishing an electric arc, means for vibrating said electrode in the direction of its length for rapidly interrupting said arc, means for changing the period of vibration of said electrode, and means for directing a cooling fluid onto the seat of said arc on the metal for vacating the metal liberated by said arc.

2. In apparatus for burning precision holes in hardened metal, a hollow electrode, means for forcing a fluid under pressure through said electrode, means for intermittently contacting said electrode with said metal, comprising means operated by said pressure fluid for urging said electrode toward the metal and electrically operated means for urging said electrode away from said metal, and means for applying an electrical potential across said electrode and said metal.

HENRY J. BURNETT.

REFERENCES CITED

The following references are of record in the file of this patent:

UNITED STATES PATENTS

| Number | Name | Date |
|---|---|---|
| 1,804,059 | Miller | May 5, 1931 |
| 1,147,783 | Carter | July 27, 1915 |
| 650,124 | Coleman | May 22, 1900 |
| 866,498 | Meune | Sept. 17, 1907 |
| 1,318,147 | Herrick | Oct. 7, 1919 |
| 1,321,309 | Halslag | Nov. 11, 1919 |
| 1,324,337 | Chapman et al. | Dec. 9, 1919 |
| 1,927,135 | Sammons | Sept. 19, 1933 |
| 1,984,809 | Requa | Dec. 18, 1934 |
| 2,066,588 | Taylor | Jan. 5, 1937 |
| 2,079,310 | Bennett | May 4, 1937 |
| 2,273,819 | Cooke et al. | Feb. 24, 1942 |